Sept. 6, 1966   E. J. TISHLER ET AL   3,270,425
GEAR TOOTH FORM CHECKER

Filed March 20, 1964   6 Sheets-Sheet 3

GLEN A. WEINERT
EARL J. TISHLER
INVENTORS

BY
John R. Faulkner
Robert E. McCollum
ATTORNEYS

United States Patent Office 3,270,425
Patented Sept. 6, 1966

3,270,425
GEAR TOOTH FORM CHECKER
Earl J. Tishler, Dearborn, and Glen A. Weinert, Detroit, Mich., assignors to Ford Motor Company, Dearborn, Mich., a corporation of Delaware
Filed Mar. 20, 1964, Ser. No. 353,497
15 Claims. (Cl. 33—179.5)

This invention relates to an apparatus for checking the shape of gear teeth. More particularly, it relates to a machine for measuring the profile and lengthwise curvature of the family of conically cut gear teeth. It also relates to a machine for checking the actual tooth shape against design.

Machines are known for checking the involute tooth profiles of spur and helical gears, for example, but these cannot be used to check the profile of conically cut gear teeth. One reason is that the shape of the gear teeth, in the case of a hypoid gear, for example, varies at each position from end-to-end, instead of being constant, as in a spur gear. Therefore, a different profile would be obtained at every checking position along the tooth. Also, even if this check were practical for hypoid gears, it would not show the curved lengthwise shape of the tooth.

At the present time, no machine is known for tracing or scanning the lengthwise curvature of the conically cut gear teeth, such as are used, for example in automotive hypoid ring gears. Furthermore, no machine is known for checking the lengthwise curvature of such a tooth against design. Also, no machine is known that not only checks the tooth profile, but also the lengthwise or face curvature.

It has been possible to check hypoid axle gears against a master or control gear to measure the deviations between the two; however, this presupposed that the master gear was a perfect one, and corresponded exactly to design specifications. Since, however, there has been no practical or economical way to check the master gear tooth shape until this invention, there has been no simple method for checking the master gear against design specifications or to record any error that may have arisen during the manufacturing of the master gear. Gear teeth that are hardened usually undergo minor changes during the heat treating process, the degree of change depending upon the shape and size of the gear, and the method of hardening. For example, while the green gear may conform to design specifications, heat treating will cause minor variations, and subsequent lapping or grinding will further change the gear tooth shape. If the gear teeth could be checked after each of these processes, the changes could be compensated for. The prior art, however, does not show or describe any machine for so checking the gear tooth form before or after any of these stages.

It is possible, through a laborious and time consuming point-by-point process, to check the shape of any particular gear. But such procedures are not practical, and the data cannot be related to either the design specifications or the functional properties of the gear.

The invention provides a machine for statically measuring both the lengthwise contour and profile of a conically cut tooth, such as for a ring gear, for example. It provides an apparatus for checking the actual profile and lengthwise curvature of the tooth against design, and thus provides important data. For example, once the deviation from design data is known, it can be compensated for in future designs; or, knowing the deviation from design after each step in the manufacturing process will lead to better controls in the finishing operations.

The error in tooth form is particularly significant in automotive vehicle installations, for example, because the level of conjugation error between hypoid pinion and ring gears in a set of gears is directly related to gear noise level. Thus, greater control of the manufacturing processes of gears will provide lower gear noise levels, and more satisfactory operation to a customer.

One of the objects of the invention, therefore, is to provide an apparatus for scanning the lengthwise contour of a conically cut gear tooth.

Another object of the invention is to provide an apparatus for comparing actual profile and lengthwise curvature of a conically cut gear tooth against design.

It is a further object of the invention to provide a gear tooth checking and scanning apparatus that provides; a recording indicator capable of being located in space at an attitude corresponding to the actual root, spiral, pressure angle unbalance, and cutter angles of a gear tooth, and alternately at an atitude corresponding to the design angles; the indicator being angularly and linearly movable along paths that, selectively, will represent the actual lengthwise curvature and profile of a conically cut gear tooth at a specified distance from the gear axis and back face, or can be adjusted to represent the design paths; the indicator being capable of sensing the deviation between actual and design profiles and curvatures; and, the indicator being adjustable so that the root, spiral, pressure angle unbalance, and cutter angles can be changed to conform to any number of various tooth profiles and lengthwise curvatures.

Other objects, features, and advantages of the invention will become apparent upon reference to the succeeding detailed description thereof, and to the drawings illustrating one embodiment thereof; wherein.

FIGURE 5 shows a side elevational view, with parts broken away, of details of FIGURE 2;

FIGURE 8 shows a view similar to FIGURE 1, illustrating a different use of the invention; and, FIGURE 9 shows a perspective view of details.

Figure 1:
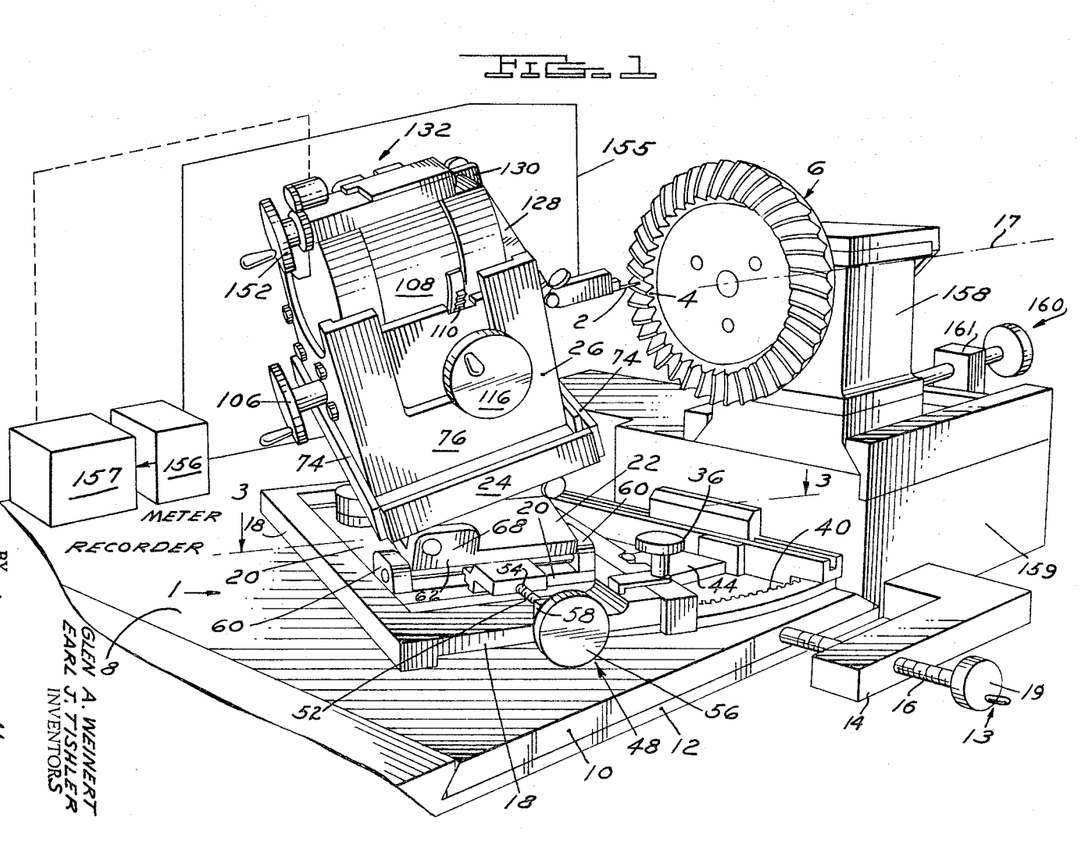
FIGURE 1 shows a perspective front elevational view of an apparatus embodying the invention.

As stated above, the invention, in general, provides an apparatus for checking the actual shape and position in space of a gear tooth, as well as checking it against design specifications. FIGURE 1, which is essentially to scale, shows a conical scanner 1 for accomplishing these functions. It will be clear, however, that other scanners can be constructed, using the teaching of the invention in FIGURE 1. The conical scanner 1, in general, includes a known type of pointed recording indicator, scanner, or pickup 2. The indicator can be located in space, by adjustment of its supporting apparatus, in such a manner that it will be at the proper attitude to scan both the lengthwise curvature and profile of a gear tooth 4. This is accomplished by providing the supporting apparatus with an adjustable base 18 and a number of tiltable or slidable sub-bases 20, 22, 24 and 26.

The individual and collective adjustments of the bases locate the indicator at a point in space contacting some portion on the face of the tooth 4 of a gear 6. Subsequently, the indicator can be swung through any number of arcs corresponding substantially to the total number of arcs defined by the lengthwise curvatures of the tooth at the different points along its profile. If deviations occur between the indicator and gear tooth paths, the supporting apparatus can be adjusted until the indicator traces the exact curvature of the tooth. A similar procedure can be used to obtain a movement of the indicator at right angles to the previous movement, corresponding to the various profiles of the tooth from one end to the other.

Before proceeding to the detailed description of the invention, it is believed that it will be more easily understood if we first consider some of the procedures used in designing automotive hypoid gears, for example. Assume, for example, that we wish to design the ring gear 6 of a crossed-axes hypoid gear set. One of the first things determined is a single point in space where the tooth mesh is to take place. Knowing this we will know the offset distance; that is, the distance that the axis of the hypoid pinion gear (not shown) is displaced vertically from the axis 17 of the ring gear, and the angle (in a horizontal plane) between the gear shafts. The gear blanks are then designed so that the gear cutter will pass through this general contact point in a manner to satisfy the kinematic relationship between gear teeth.

While gear teeth have many contact points, the design of hypoid gears, for example, has not progressed beyond the point of locating a single mean contact point, and calculating the spiral, root, pressure angle unbalance, and cutter angles as related to the offset distance and other parameters to satisfy the tooth requirements at that point. The rest of the tooth surface is left to be generated by the cutting machine, with the expectation that the shape will fall within design standards to provide conjugate action between ring and pinion gears. This single contact point is calculated to be where the design cones are tangent to each other, and also one through which the tangents to the spiral and cutter angles pass.

The offset distance and other assumed parameters determine the particular spiral angle that the cutter must provide at this point to assure proper endwise sliding of the mating gear teeth on each other. The proper tooth pressure angle unbalance must also be chosen to provide symmetrical action on both sides of the tooth. In a complex gear of this type, the cutter does not cut a symmetrically formed tooth since the pressure angles are different on opposite sides of the tooth. A particular root angle also must be calculated to determine the depth of the tooth, which tapers along it length.

Once having determined the particular angles and other dimensions described, the gear cutting machine is set up according to these parameters, and the gear teeth are subsequently cut. At this state, a theoretically correct gear tooth should result. However, because of subsequent heat treating, lapping, grinding, and other manufacturing processes, the gear tooth form changes. Therefore, the finished product may not necessarily correspond to design specifications.

Prior to the invention, there was no practical or economical way in which to check the nominal shape of a complex gear tooth such as those that make up a conically cut hypoid ring gear, for example. As stated previously, it is quite possible, by a laborious point-by-point measurement, to obtain the actual form of any tooth shape in a three-coordinate system, but this data is of little use since, as stated, the nominal shape of the tooth cannot easily be calculated.

The invention provides an apparatus for scanning the shape of a gear tooth of the complex type described. The machine will not only scan the actual shape of the gear tooth, but can measure the deviation between actual tooth form and design specifications.

Returning now to the drawings, FIGURE 1 shows the gear tooth scanner 1 as mounted on a table or stand 8.

The table is in two parts, 10 and 12, that are tongue and grooved for a slidable movement of part 10 relative to part 12 in one plane by a screw adjusting mechanism 13. This latter mechanism consists of a threaded block 14 fixed to table part 10, and engaged by a rotatable but non-axially movable screw 16 rotatably fixed to table part 12. Rotation of a handwheel 19 moves part 10.

Figure 3:
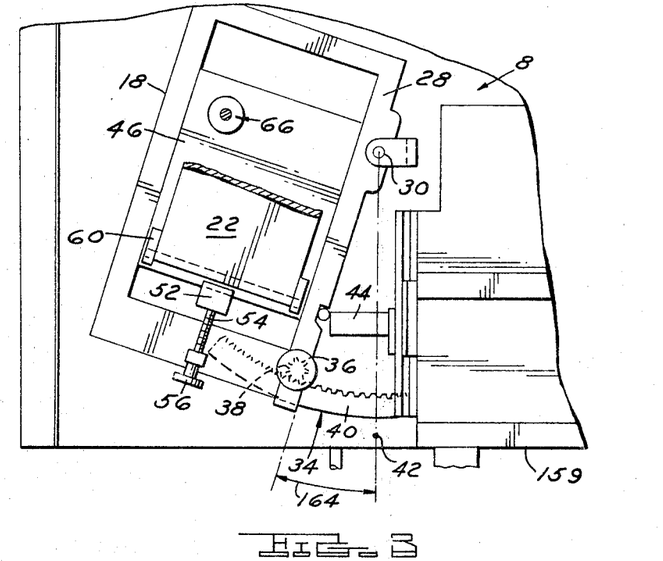
FIGURE 3 shows a cross-sectional view taken on a plane indicated by and viewed in the direction of the arrows 3—3 of FIGURE 1.

As best seen in FIGURE 3, the main base 18 of the scanner 10 is substantially a rectangular flat frame, one side of which is pivotally secured to the table by a pin 30. The frame can be swung about the pivot by means of a rack and pinion mechanism 34. A shaft secured to a hand knob 36 extends rotatably through base 18, and is secured to a pinion 38. The pinion meshes with an arcuate rack member 40 non-movably secured to table part 10. Rotation of knob 36 in either direction will swing base 18 and the entire scanner 1 through an infinite number of angular positions up to, say, 20° from a line 42 parallel to the axis of the tongue and groove connection of table parts 10 and 12. A measuring scale, not shown, can be provided, if desired. Suitable gauge blocks, such as are shown at 44, may be used to provide exact or precise angles, although these may be omitted, as desired.

A sub-base 20 (FIGURE 1) is slidably mounted within the frame of base 18 for a reciprocating movement to different positions by a screw mechanism 48. This mechanism has a bolt 52 that is fixed at one end in a block 54 on sub-base 20, and at its other end to a hand knob 56. The shaft is threaded through a block 58 fixed to base 18 to linearly move block 54 upon rotation of knob 56.

Figure 2:
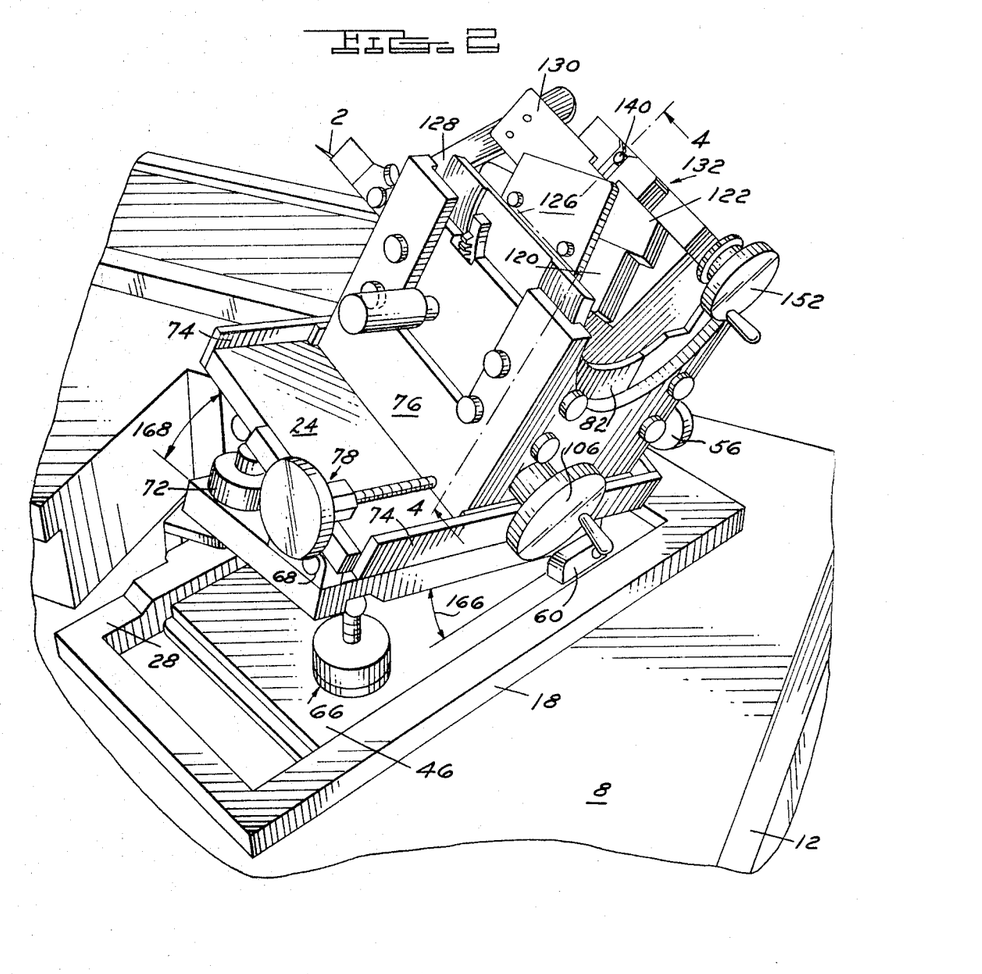
FIGURE 2 shows a rear perspective elevational view of a portion of the apparatus of FIGURE 1.

The sub-base 20 has two spaced upstanding ears 60 at opposite sides pivotally supporting one end 62 of plate 22. The opposite end of this plate can be raised or lowered through predetermined angles by an adjustable screw mechanism 66 of a known type. Plate 22 is similarly provide with an ear 68 at each end on one side for pivotally mounting the edge of another plate 24. This latter plate is adapted to be tilted to various angles with respect to plate 22 by means of a screw adjusting device 72. Plate 24 is provided with parallel sides 74 together defining a slideway for a main box-like housing 26 (FIGURE 1) that can be reciprocated on plate 24 by a screw mechanism 78 (FIG. 2). The walls 76 of the housing define a vertical slideway for a main pivot block or hollow support 82.

Figure 4:
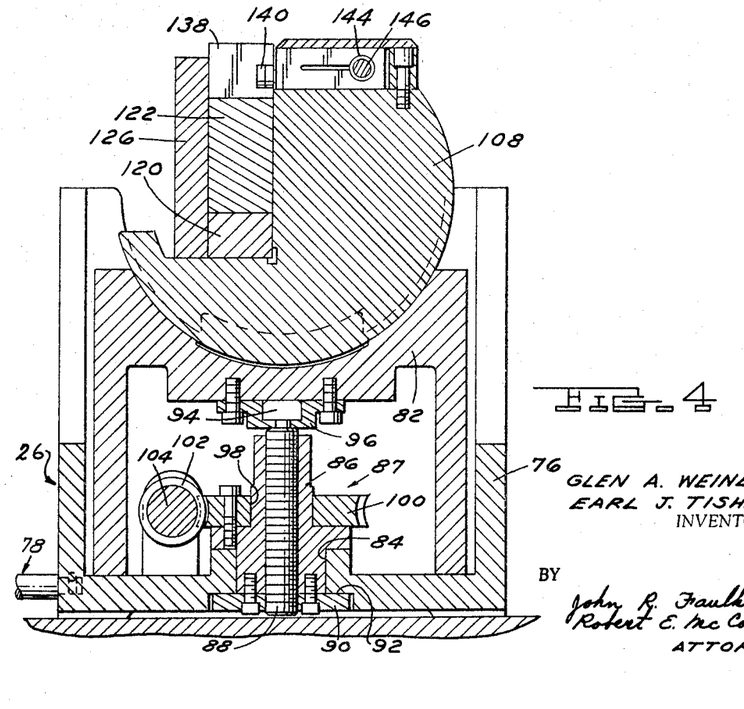
FIGURE 4 shows a cross-sectional view taken on a plane indicated by and viewed in the direction of arrows 4—4 of FIGURES 2, 5 and 6.

As best seen in FIGURE 4, housing 26 has a central opening 84 within which is rotatably mounted the nut 86 for a screw mechanism 87. Nut 86 threadedly receives a non-rotating but axially movable threaded bolt 88 that projects at one end through an annular cap 90 bolted to the nut. The cap bears against stepped shoulders 92 on housing 26 to axially locate nut 86. The headed end 94 of bolt 88 is fixedly retained within a hat-shaped enclosure 96 bolted to the underside of pivot block 82. Nut 86 has a reduced diameter portion 98 on which is press fitted, or otherwise secured, a gear 100. The gear meshes with a worm gear 102 secured on a shaft 104. This latter shaft extends through both support 82 and housing 76, and has a handwheel 106 (FIGS. 1 and 2) secured to it. Rotation of the wheel rotates nut 86 to vertically move bolt 88 and support 82.

Figure 7:
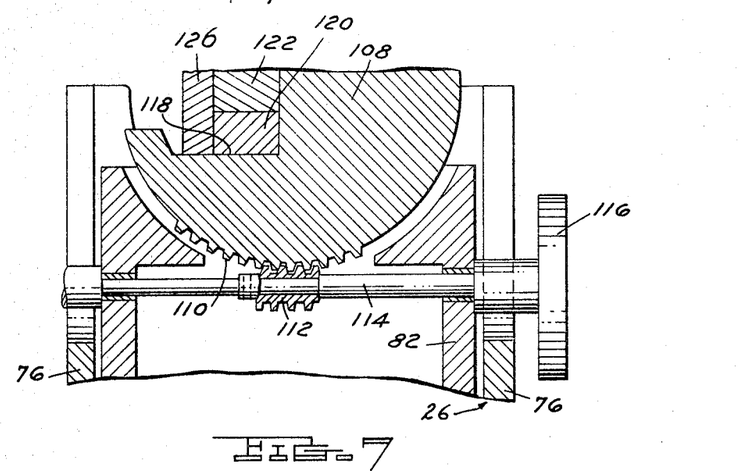
FIGURE 7 shows a cross-sectional view of details taken on a plane indicated by and viewed in the direction of arrows 7—7 of FIGURE 5.

The top portion of the main pivot block 82 has a cradle shape for rotatably supporting a cylindrical member 108. The underside of member 108 has a worm wheel portion 110 (FIG. 7) secured to it, the teeth of which mesh with a worm gear 112. This latter gear is fixed to a shaft 114 rotatably projecting through the walls of pivot block 82 and the housing 26. Rotation of a handwheel 116 causes a corresponding rotation of the cylindrical member 108. The drum member 108 has a lengthwise cut 118 that serves as a base for a sine bar 120 (FIGURES 4 and 5) adjustably secured to the drum. A wedge 122 is slidably mounted on the sine bar 120, and has a base surface 124 parallel to the sine bar upper surface. The wedge 122 is held in position against drum 108 by a side plate 126 bolted to sine plate 120. The bolting prevents lateral movement of wedge 122 while permitting it to slide longitudinally relative to the sine bar. A supporting arm 128 for the indicator 2 is fixed to a bifurcated end 130 of wedge 122. The radial distance from the axis of the member 108 to the tip of the indicator 2 is made the same as the radial distance from the axis of gear 6 to the contact point on tooth 4 so that the two points can generate the same curve.

The sine bar 120 determines the angle at which the pointed indicator 2 will traverse the profile of a tooth 4 on gear 6. The angle of the sine bar is chosen to be equal to one half of the included angle that the tooth cutter would have. The wedge 122, therefore, is movable back and forth on the sine bar along a line that is parallel or coincident with the line defining the profile of the gear tooth at that particular point along the tooth endwise curvature. This is accomplished by a screw mechanism 132.

Figure 6:
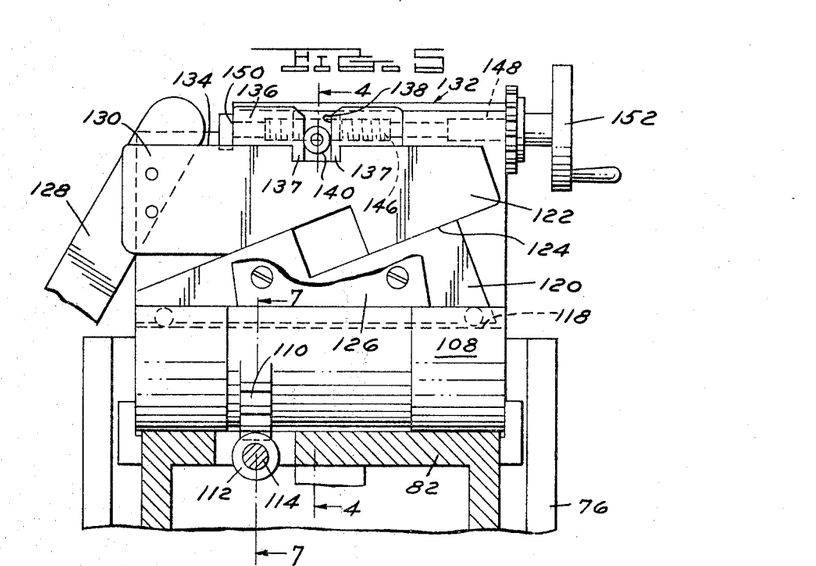
FIGURE 6 shows a plan view, with parts broken away and in section, of a portion of the apparatus shown in FIGURE 5.

As best seen in FIGURES 4, 5 and 6, the wedge 122 has a flat top surface 134 on which are bolted two blocks 136. The blocks have spaced portions 137 defining a vertical cam follower slot 138, within which is mounted a roller 140. The roller is secured to a nut fixed to a housing 142 (FIG. 6) that is slidably mounted on the top of drum 108. The housing has a bore 144 receiving a threaded bolt or screw 146 (FIG. 4). The ends of the bolt are mounted in bearings 148 and 150 fixed to drum 108, to permit rotation of, but prevent axial movement of the bolt. The bolt projects through the end of drum 108, and is secured to a handwheel 152. Rotation of the handwheel causes longitudinal movement of the roller support nut 142 along the axis of bolt 146 to move blocks 136 and thereby move wedge 122 along the surface 124 of sine bar 120 in the same direction. The diagonal movement of wedge 122 as it moves along sine bar 120 is accommodated by the vertical sliding movement of blocks 136 relative to roller 140.

The indicator support arm 128 has a universally movable indicator or pickup mechanism 2 (FIGS. 1 and 2) secured to the end of it. This mechanism is of a known displacement sensitive type, and is electrically connected by suitable wiring 155 to a remote indicating meter 156. This meter is connected to a recording meter 157 of a known type, the details of which are not shown. It would have a pen or wiper member movable across a paper in response to impulses from the meter 156. The paper would be automatically moved in a linear direction, by suitable electrical connections, in response to any rotation of either handwheels 152 or 116, or both, to translate the displacements of indicator 2 at any point on the profile or lengthwise curvature of tooth 4, into a visual record. Thus, when the indicator 2 is forced or moved from its normal central position, which corresponds to a zero reading on indicating meter 156, the recorder 157 automatically records the degree of deviation from normal that has occurred.

As stated previously, the indicator 2 is adapted to contact the tooth 4 of a gear 6. This gear is fixedly mounted on a base 158 at a predetermined vertical distance from the table 8, and its position is determined in such a manner that the indicator will be capable of being positioned in contact with a tooth 4 at the correct angles and position to trace the tooth shape. The base 158 has a tongue and grooved connection to a support 159, and is movable relative to the support by a screw mechanism 160. This latter mechanism is similar to mechanism 13, having a bolt secured to base 158 and movable through a block 161 secured to support 159 to axially move gear 6.

In general, once the various table parts, supports, bases, sub-bases, and plates of the scanner 1 have been adjusted so that the indicator 2 is positioned at the correct attitude in contact with one point on the face of a tooth 4 of gear 6, the indicator can then be arcuately moved along the lengthwise curvature of the tooth 4 upon rotation of drum 108 by handwheel 116. Also, the profile of the tooth can be checked at any point along the curvature by rotating handwheel 152 to slide wedge 122 on sine bar 120, thereby moving the indicator 2 in and out of the tooth recess.

In this connection, it should be noted that indicator 2 is capable of being positioned at the proper attitude in space due to the various bases and sub-bases being arranged so that their angular positions correspond to the spiral, root pressure angle unbalance, and cutter blade angles of the gear tooth in question. That is, the angle 164 (FIG. 3) between base member 18 and line 42, corresponds to the root angle for tooth 4 of gear 6. Similarly, the angle 166 (FIG. 2), between plate 22 and sub-base 20, corresponds to the spiral angle for the gear tooth. And, the angle 168, between plate 70 and plate 22, corresponds to the gear tooth pressure angle unbalance. Also, the angle that the sine bar 120 makes with the horizontal axis of drum 108 is chosen equal to one half of the included angle of the cutter.

In operation, as thus far described, the particular gear to be scanned, such as ring gear 6, is placed on stand 158, and the various bases and plates are angularly adjusted and slidably moved until indicator 2 is located in the proper position relative to the gear tooth so that it will be ready to sweep the lengthwise curvatures and profiles of the gear tooth. That is, by variably moving base 18, sub-base 20, tilting plates 22 and 24, and sliding housing 26 and pivot block 82 and sine bar 120, by their respective screw mechanisms and handwheels, the indicator 2 will be located in space at the proper angles. Subsequent rotation of handwheel 116 then provides a sweep of the indicator that is coincident with or substantially identical to the lengthwise curvature of the gear tooth at a particular location on the profile. Also, the indicator will be in a position to move across the profile of the tooth upon rotation of handwheel 152. This, of course, defines only the lengthwise curvature or profile at one particular portion of the tooth. To obtain all the sections of the tooth, the sweep is repeated with different combinations of the settings for handwheels 152 and 116.

With the indicator positioned as described, any differences between the paths defined by the indicator and the actual curvature and profile of the gear tooth during the respective rotations or linear movements will show up as deviations from a zero reading on meter 156. If the various bases and plates of unit 18 are then readjusted until the meter no longer indicates any reading other than zero during the complete sweeps of the indicator, the indicator will then have movements in one direction which are the same as the lengthwise curvatures of the gear tooth, and movements in another direction which are the same as the profiles of the tooth.

Once this setting of the scanner 1 has been attained, the actual gear tooth spiral, pressure angle unbalance and cutter angles can be determined by measuring the respective angles 164 (FIG. 3), 166, 168 (FIG. 2), and the sine bar angle (FIG. 5). This information can be used in redesigning a hypoid gear, for example, to compensate for the change in angles occasioned by the manufacturing process. That is, an allowance can be made so that the finished product will more closely approach design specifications. Or, if the design information is not known, other supposedly identical gears can be substituted for gear 6, and checked to see if their tooth shape is the same as that of gear 6. This would provide a quality control with dimensional references.

Figures 8, 9:
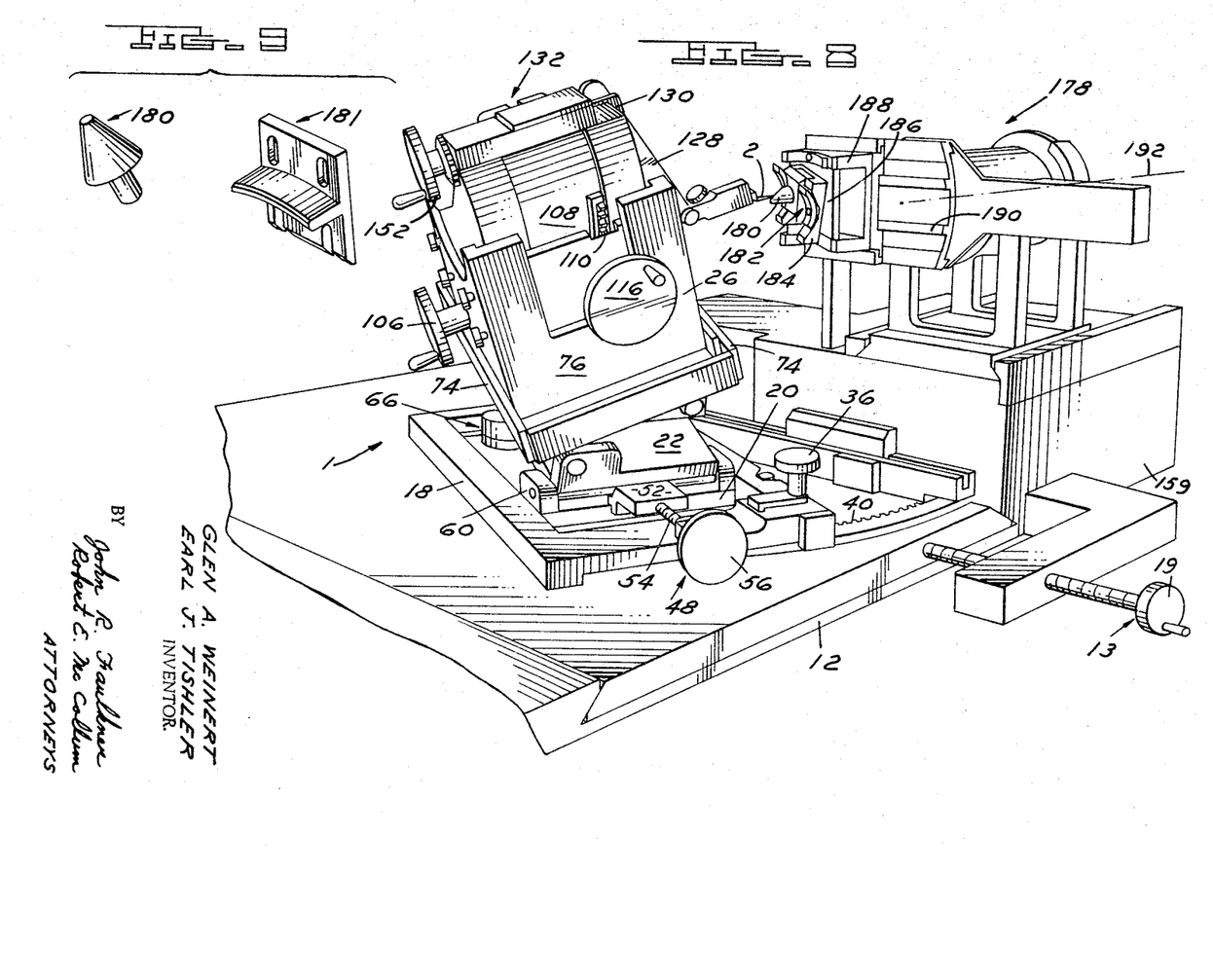

The scanner 1 has still a further utility in that it can be used to check deviations from design specifications in another way. As shown in FIGURE 8, the gear 6 is replaced on stand 158 by an apparatus 178 that has a conical stylus 180. This stylus is constructed with a conical surface that simulates the design conical profile at one point on a tooth on the ring gear 6. That is, the apparatus supporting stylus 180 is so constructed that the simulated tooth segment is positioned at tooth design angles and distances for a particular contact point on the tooth, and therefore, represents a theoretical section of the finished gear tooth.

In brief, the apparatus indicated at 178 has the stylus 180 mounted to simulate a portion of the surface of a tooth such as tooth 4 of gear 6. It is usually set to design angles and dimensions, and will then simulate a section of a ring gear tooth surface, for example, that agrees in all respects to design specifications. This simulated tooth section is then put into contact with the mating hypoid pinion gear, for example, of a rear axle hypoid gear set, and the stylus and pinion then are rotated in a manner normally providing a constant velocity ratio. A sensor picks up any conjugation error between the two, which tells the designer the off design conjugation error of the pinion relative to the ring gear.

The stylus 180 is mounted on several cradles that are adjustable so that the conical stylus can also be positioned at an attitude in space that is off design; that is, one that represents the attitude that the gear tooth 4 actually has after the finishing processes. The stylus 180 would now simulate an actual tooth segment of ring gear 6. The apparatus 178 could then be removed, the tooth element 180 rotated with the hypoid pinion gear mentioned earlier, and the relative conjugation error between the two will be recorded.

Thus, it will be seen that the apparatus of this invention provides the gear designer with extensive information that not only enables him to design better gears, but also to manufacture more closely conjugate hypoid gear sets, for example.

Referring to FIGURE 8, apparatus 178 can have as many interchangeable simulated tooth sections or conical stylii as are needed to completely define the tooth shape. Two of these are shown at 180 and 181 in FIGURE 9. The element 181 represents the design conical lengthwise surface for a tooth 4 of gear 6 at one particular point along the profile of the tooth. As stated previously, the element 180 represents a design profile section at one particular point along the curvature of tooth 4. When the gear is designed, as stated previously, a mean contact point is calculated for the gear tooth, and the respective design spiral, root, pressure angle unbalance and other angles are chosen using this point as a reference. The designer thus knows what form the tooth should have at this point to satisfy all the parameters. The curvatures at other points can also be calculated. The surface of stylus 180 or 181, and as many other stylii as are needed, is then carefully ground to represent the design curvature or profile of the tooth along a lengthwise or crosswise section of the tooth.

The stylus 180 or 181 is positioned in space in a unique manner. The particular tooth design point chosen is located so that its offset distance from the axes 192 is the same as the offset distance for the tooth of gear 6 that it simulates; and the tooth segment attitude corresponds to the design tooth spiral, root and pressure angle unbalance. This is accomplished as follows. The stylus 180 or 181 is fixed to a slide, not shown, that is linearly adjustable with respect to a base 182 rockably mounted in a first cradle 184. The cradle is in turn rotatably mounted on a base 186 rockably mounted in a second cradle 188. The second cradle is slidably mounted on one end of a base 190 for a longitudinal movement. The parts are interconnected so that the axes of rotation of the cradles 184 and 188 pass through the design point on the element 180 or 181. Therefore, regardless of individual adjustments of the cradles, their apexes remain at the design point.

Cradle 188 can be moved towards or away from the axes 192 of the gear carrier base to establish the design offset distance chosen for gear 6. Rocking of cradle 188 to a particular angle positions the simulated tooth segment for the design root angle. Rotation of cradle 184 establishes the tooth segment at the design spiral angle. And, rocking in cradle 184 presents the tooth with the design pressure angle unbalance. Finally, reciprocating the element 180 or 181 on slide 182 positions it to engage the design point with indicator 2.

Since the scanner 1 has previously been adjusted to move the indicator 2 to accurately scan the shape of the gear tooth 4, it is now also possible to compare the actual finished position of gear tooth 4 with design specifications.

For example, if handwheel 152 is rotated, the indicator 2 will traverse the simulated tooth 180, and any deviation of indicator 2 (set to gear tooth profile) from design profile will be indicated on remote meter 156 and recorder 157. The attitude and position of the simulated tooth element 180 can then be adjusted to conform exactly to the movement of indicator 2. This immediately informs the designer the amount of the gear tooth 4, at this profile section, is off design. The spiral, root, pressure angle unbalance, etc. of the element 180 can then be adjusted until lengthwise movement of the indicator 2 shows a zero reading on the meter. At this point, the simulated tooth section 180 will be at an attitude and position identical to the corresponding section on the actual finished gear tooth 4. The angular and dimensional adjustments needed to correct the attitude of the simulated tooth section 180 to agree with that of the actual tooth portion can then be recorded. The designer can use this information to correct the machine settings used to cut the gear tooth during the manufacturing processes. Also, since the element 180 is now at an attitude representing an actual gear tooth profile segment, it can be rotated with a hypoid pinion gear tooth and the conjugation error between the actual gear teeth be recorded.

From the above, it will be seen that the invention provides an apparatus for checking the finished gear form against design specifications. This has not been possible in the past with respect to hypoid axle gears that are plunge cut by conical cutters, for example.

An alternate method of checking gear tooth shape against design specifications would be to initially position the simulated tooth section 180 or 181 or others at design attitude and positions. The scanner 1 would then be adjusted, as described previously, to coordinate the indicator 2 movements exactly to design specifications so that the meter 156 would read zero for each sweep of the indicator over the various simulated tooth sections. The actual finished gear 6 can then be substituted for the simulated tooth sections and its apparatus 178, and the indicator 2 moved along the actual tooth form. Any deviation of the actual form of tooth 4 from design (represented by the indicator 2) will then be indicated on the meter.

While the invention has been illustrated in one embodiment in the figures, it will be clear to those skilled in the arts to which the invention pertains that many changes and modifications may be made thereto without departing from the scope of the invention.

We claim:

1. A gear checking mechanism comprising, in combination, a conically cut gear tooth form scanning apparatus for scanning the lengthwise curvature of a gear tooth cut by a conical cutter, and a test gear mounting member positioned adjacent said apparatus, said apparatus including a tooth form scanning device, a deviation responsive recording indicator adjustably mounted on said device and having a relatively deflectable pickup adapted to contact the surface of a tooth of a test gear mounted on said member, means for adjusting the position of said indicator and pickup relative to said test gear mounting member for movement through an arc simulating the actual arc of one lengthwise curvature of the test gear tooth, said latter means also being adjustable to effect an angular movement of said indicator pickup along an arc corresponding to a theoretically correct lengthwise curvature of the test gear tooth being scanned, and means responsive to deflection of said indicator pickup due to variations between the theoretically correct and actual lengthwise arcs of the test gear tooth upon movement of said indicator pickup lengthwise along the surface of the test gear tooth while adjusted for the theoretically correct arc for recording the variations between the actual and theoretically correct lengthwise curvatures of the test gear tooth.

2. A gear checking mechanism comprising, in combination, a conically cut gear tooth form scanning apparatus for scanning the lengthwise curvature of a gear tooth cut by a conical cutter, and a test gear mounting member positioned adjacent said apparatus, said apparatus including a tooth form scanning device, a deviation responsive recording indicator adjustably mounted on said device and having a relatively deflectable pickup adapted to contact the surface of a tooth of a test gear mounted on said member, said indicator being mounted for rotation about an axis space therefrom, means for adjusting the position of said indicator and pickup relative to a test gear mounted on said member for movement through an arc corresponding to one lengthwise curvature of the face of a tooth on said test gear and means for varying the attitude of said axis in a plurality of directions to position said indicator pickup against said gear tooth at an inclination corresponding to the design attitude of the surface portion of said gear tooth contacted by said indicator pickup, means for swinging said indicator pickup about said axis to follow the lengthwise curvature of said gear tooth, means responsive to a deflection of said indicator pickup in response to a variation between design and actual tooth face curvatures as said indicator pickup follows the form of said tooth while adjusted for said design path for recording the variations of said gear tooth lengthwise curvature from design.

3. A gear checking mechanism comprising, in combination a conically cut gear tooth form checking apparatus for scanning the lengthwise curvature and profile of a gear tooth cut by a conical cutter, and a test gear mounting member positioned adjacent said apparatus, said apparatus including a tooth form scanning machine, a deviation responsive recording indicator adjustably mounted on said machine and having a relatively deflectable pickup adapted to contact the surface of a tooth of a test gear mounted on said member, first mounting means mounting said indicator and pickup for movement through an arcuate path corresponding to a lengthwise curvature of the face of said tooth, second mounting means mounting said indicator and pickup for travel along a path corresponding to a profile of said tooth, means to adjust said mountings to position said indicator pickup for movements along the tooth design paths for said lengthwise curvature and profile, means responsive to a deflection of said indicator pickup in response to a variation between design and actual tooth profile and face curvature as said indicator pickup follows the form of said tooth while adjusted for said design path for recording the variations of said gear tooth lengthwise curvature and profile for design.

4. A gear checking mechanism comprising, in combination, a conically cut gear tooth form checking apparatus for scanning the lengthwise curvatures and profiles of a gear tooth cut by a conical cutter, and a test gear mounting member positioned adjacent said apparatus, said apparatus including a tooth form checking machine, a deviation responsive recording indicator adjustably mounted on said machine and having a relatively deflectable pickup adapted to contact the surface of a tooth of a test gear mounted on said member, said indicator and pickup being axially movable and mounted for rotation about an axis spaced therefrom, and means for varying the attitude of said axis in a plurality of planes to position said indicator pickup against said gear tooth at different inclinations corresponding to the actual and design inclinations of said gear tooth, means for swinging said indicator pickup about said axis to follow a lengthwise curvature of said gear tooth, and means for moving said indicator pickup axially to follow a profile of said gear tooth, and means responsive to a deflection of said indicator pickup in response to a variation between design and actual tooth profiles and face curvatures as said indicator pickup follows the form of said tooth while adjusted for said design path for each inclination of said axis for recording the variations of said gear tooth lengthwise curvature and profile from design.

5. A gear checking mechanism comprising, in combination, a conically cut gear tooth form checking apparatus for scanning the lengthwise curvature and profile of a gear tooth cut by a conical cutter, and a test gear mounting member positioned adjacent said apparatus, said apparatus including a tooth form scanning machine, a deviation responsive recording indicator adjustably mounted on said machine and having a relatively deflectable pickup adapted to contact the surface of a tooth of a test gear mounted on said member, said indicator and pickup being axially movable and mounted for rotation about an axis spaced therefrom, and means for varying the attitude of said axis in at least three different directions to position said indicator pickup against said gear tooth at an inclination corresponding to the actual and design attitude of the surface of said gear tooth contacted by said indicator, means for switching said indicator pickup about said axis to follow a lengthwise curvature of said gear tooth, and means for moving said indicator pickup axially to follow a profile of said gear tooth, and means resopnsive to a deflection of said indicator pickup in response to a variation between design and actual tooth profile and face curvature as said indicator follows the form of said tooth while adjusted for said design path for recording the variations of said gear tooth lengthwise curvature and profile from design.

6. A gear checking mechanism comprising, in combination, a conically cut gear tooth form checking apparatus for scanning the lengthwise curvature of a gear tooth cut by a conical cutter, and a test gear mounting member positioned adjacent said apparatus, said apparatus including a tooth form scanning device, a deviation responsive indicator having a deflectable pickup adapted to contact the face of a tooth of said gear, first means on said device mounting said indicator pickup for an angular movement through an arc similar to an arc defined by a portion of the lengthwise curved face of a tooth of a test gear mounted on said member, other mounting means on said device adjustably mounting said first means for movement sequentially in a plurality of directions to position said first means in a location wherein said arcs substantially coincide, means for angularly moving said indicator pickup along the face of said tooth, said indicator pickup deflecting in response to variations between the tooth face curvature and the indicator pickup arc, and means to adjust said other means to change the path of travel of said indicator pickup to coincide with the actual lengthwise curvature of said tooth.

7. A gear checking mechanism comprising, in combination, a conically cut gear tooth checking apparatus for tracing the profile and lengthwise curvature of a gear tooth cut by a conical cutter, and a test gear mounting member positioned adjacent said apparatus, said apparatus including a tooth form checking device, a deviation responsive indicator having a deflectable pickup adapted to contact the face of a tooth of a test gear mounted on said member, first mounting means mounting said indicator pickup for an angular movement through an arc corresponding to an arc contained in the lengthwise curved face of said tooth, second means mounting said indicator pickup for a travel along a line similar to the line defined by a profile of said tooth, other mounting means adjustably mounting said first and second means for movement sequentially in a plurality of directions to position said first and second means in locations wherein said indicator pickup and tooth face arcs and indicator pickup and tooth profile lines substantially coincide, respectively, means for angularly and linearly moving said indicator pickup over the surface of said tooth, said indicator pickup deflecting in response to a variation in curvature between said indicator and tooth face arcs and said indicator and tooth profile lines, and means to adjust said first and second means to cause the travel of said indicator pickup to coincide with the actual lengthwise curvature and profiles of said tooth.

8. A gear checking mechanism comprising, in combination, a conically cut gear tooth form checking apparatus for scanning the lengthwise curvature of a gear tooth cut by a conical cutter, and a test gear mounting member positoned adjacent said apparatus, said apparatus including a deviation responsive indicator having a deflectable pickup adapted to contact a point on the face of a tooth of a test gear mounted on said member, the end-to-end curvature of said face including an arc containing said point, means mounting said indicator pickup for a swinging movement through an arc corresponding to the tooth face arc containing said point, and means to move said indicator pickup along the face of said tooth, variations between the indicator pickup arc and the said tooth face arc during the travel of said indicator pickup along said tooth face deflecting said indicator pickup, and means to adjust the attitude of said indicator pickup to effect a travel of said indicator pickup that coincides with the actual arc of said tooth face.

9. A gear checking mechanism comprising in combination, a conically cut gear tooth form checking apparatus for scanning the lengthwise curvature and profile of a gear tooth cut by a conical cutter, and a test gear mounting member positioned adjacent said apparatus, said apparatus including a deviation responsive indicator having a deflectable pickup adapted to contact a point on the face of a tooth of a test gear mounted on said member, the end-to-end curvature of said face including an arc containing said point, means mounting said indicator pickup for a swinging movement through an arc corresponding to the tooth face arc containing said point, means mounting said indicator pickup for a linear movement defining a line corresponding to a profile of said tooth containing said point, and means to move said indicator pickup along the face arc and profile of said tooth, variations between the indicator pickup arc and the said tooth face arc during the respective angular and linear travels of said indicator pickup along and across said tooth face deflecting said indicator pickup, and means to adjust the attitude of said indicator pickup to effect a travel of said indicator pickup that coincides with the actual arc and profile of said tooth face.

10. A gear checking mechanism comprising, in combination, a conically cut gear tooth form checking apparatus for scanning the lengthwise curvature of a gear tooth cut by a conical cutter, and a test gear mounting member positioned adjacent said apparatus, said apparatus including a deviation responsive indicator having a deflectable pickup adated to contact a point on the face of a tooth of a test gear mounted on said member, the end-to-end curvature of said face including an arc containing said point, means mounting said indicator pickup for a swinging movement through an arc corresponding to the tooth face design arc containing said point, and means to move said indicator pickup along the face of said tooth, variations between the indicator pickup arc and said tooth face arc during the travel of said indicator pickup along said tooth face deflecting said indicator pickup to indicate off-design error, and means to adjust the attitude of said indicator pickup to effect a travel of said indicator pickup that coincides with the actual arc of said tooth face.

11. A gear checking mechanism comprising, in combination, a conically cut gear tooth form checking apparatus for scanning the lengthwise curvature and profile of a gear tooth cut by a conical cutter, and a test gear mounting member positioned adjacent said apparatus, said apparatus including a deviation responsive indicator having a deflectable pickup adapted to contact a point on the face of a tooth of a test gear mounted on said member, the end-to-end curvature of said face including an arc containing said point, means mounting said indicator pickup for a swinging movement through an arc corresponding to the tooth face design arc containing said point, means mounting said indicator pickup for a linear movement defining a line corresponding to a design profile of said tooth containing said point, and means to move said indicator pickup along the face arc and profile of said tooth, variations between the indicator pickup arc and said tooth face arc during the respective angular and linear travels of said indicator pickup along and across said tooth face deflecting said indicator pickup to indicate off-design error, and means to adjust the attitude of said indicator pickup to effect a travel of said indicator pickup that coincides with the actual arc and profile of said tooth face.

12. A gear checking mechanism comprising, in combination, a conically cut gear tooth form checking apparatus for checking the lengthwise curvature of a gear tooth cut by a conical cutter, and a test gear mounting member positoned adjacent said apparatus, said apparatus including a tooth form checking device, a deviation responsive indicator having a deflectable pickup adapted to contact the face of a tooth of a test gear mounted on said member, adjustable means mounting said indicator and pickup on said device for movement to positions locating said indicator pickup in space at angles substantially corresponding to the angles made by the gear tooth point of contact with the axis of the gear, said latter means including a first means mounting said indicator pickup for an arcuate movement about an axis spaced therefrom at a radius corresponding to the radius of the gear tooth contact point from the gear axis, second means positioning said indicator pickup approximately at the gear tooth contact point root angle, a third means positioning said indicator pickup approximately at the gear tooth contact point cutter unbalance angle, and a fourth means positioning said indicator pickup approximately at the gear tooth contact point spiral angle, other means to move said indicator pickup angularly along said tooth face subsequent to the establishment of said indicator pickup in space at said angles, any deviation of the indicator pickup from the path of its defined arc to follow the actual tooth curvature deflecting said indicator pickup, and means to adjust the angles at which said indicator pickup is positioned to cause the travel of said indicator pickup to coincide with the actual lengthwise curvature of said tooth at that point.

13. A gear checking mechanism comprising, in combination, a conically cut gear tooth form checking apparatus for checking the profile and lengthwise curvature of a gear tooth cut by a conical cutter, and a test gear mounting member positioned adjacent said apparatus, said apparatus including a tooth form checking device, a deviation responsive indicator having a deflectable pickup adapted to contact the face of a tooth of a test gear mounted on said member, adjustable means mounting said indicator and pickup on said device for movement to positions locating said indicator pickup in space at angles substantially corresponding to the angles made by the gear tooth point of contact with the axis of the gear, said latter means including one means mounting said indicator pickup for an arcuate movement about an axis spaced therefrom at a radius corresponding to the radius of the gear tooth contact point from the gear axis, another means mounting the axis of rotation of said indicator pickup for a linear movement along a line corresponding to a profile of said tooth, second means positioning said indicator pickup approximately at the gear tooth contact point root angle, a third means positioning said indicator pickup approximately at the gear tooth contact point cutter unbalance angle, and a fourth means positioning said indicator pickup approximately at the gear tooth contact point spiral angle, further means to selectively move said indicator pickup linearly across a profile of said tooth or angularly along said tooth curvature, subsequent to the establishment of said indicator pickup in space at said angles, any deviation of the indicator pickup from the profile or path of its defined arc to follow the actual tooth profile or curvature deflecting said indicator pickup, and means to adjust the angles at which said indicator pickup is positioned to cause the travel of said indicator pickup to coincide with the actual profile or lengthwise curvature of said tooth at that point.

14. A gear checking mechanism comprising, in combination, a conically cut gear tooth form checking apparatus for checking the lengthwise curvature of a gear tooth cut by a conical cutter against design and a test gear mounting member positioned adjacent said apparatus, said apparatus including, a tooth form checking device, a deviation responsive indicator having a deflectable pickup adapted to contact the face of a tooth of a test gear mounted on said member, adjustable means mounting said indicator and pickup on said device for movement to positions locating said indicator pickup in space at angles substantially corresponding to the design angles made by the gear tooth point of contact with the axis of the gear, said latter means including a first means mounting said indicator pickup for an arcuate movement about an axis spaced therefrom at a radius corresponding to the design radius of the gear tooth contact point from the gear axis, second means positioning said indicator pickup at the gear tooth contact point design root angle, a third means positioning said indicator pickup at the gear tooth contact point design cutter unbalance angle, and a fourth means positioning said indicator pickup at the gear tooth contact point design spiral angle, other means to move said indicator pickup angularly along said tooth curvature subsequent to the establishment of said indicator pickup in space at said design angles, any deviation of the indicator pickup from the path of its defined arc to follow the actual tooth curvature deflecting said indicator pickup, and means to adjust the angles at which said indicator pickup is positioned to cause the travel of said indicator pickup to coincide with the actual lengthwise curvature of said tooth at that point whereby the variance between the design and adjusted angles can be measured.

15. A gear checking mechanism comprising, in combination, a conically cut gear tooth form checking apparatus for checking the profile and lengthwise curvature of a gear tooth cut by a conical cutter against design, and a test gear mounting member positioned adjacent said apparatus, said apparatus including a tooth form checking device, a deviation responsive indicator having a deflectable pickup adapted to contact the face of a tooth of a test gear mounted on said member, adjustable means mounting said indicator and pickup on said device for movement to positions locating said indicator pickup in space at angles substantially corresponding to the design angles made by the gear tooth point of contact with the axis of the gear, said latter means including a first means mounting said indicator pickup for an arcuate movement about an axis spaced therefrom at a radius corresponding to the design radius of the gear tooth contact point from the gear axis, another means mounting the axis of rotation of said indicator pickup for a linear movement along a line corresponding to a profile of said tooth, second means positioning said indicator pickup at the gear tooth contact point design root angle, a third means positioning said indicator pickup at the gear tooth contact point design cutter unbalance angle, and a fourth means positioning said indicator pickup at the gear tooth contact point design spiral angle, further means to selectively move said indicator pickup linearly across a profile of said tooth or angularly along said tooth curvature, subsequent to the establishment of said indicator pickup in space at said angles, any deviation of the indicator pickup from the profile or path of its defined arc to follow the actual tooth profile or curvature deflecting said indicator pickup, and means to adjust the angles at which said indicator pickup is positioned to cause the travel of said indicator pickup to coincide with the actual profile or lengthwise curvature of said tooth at that point.

References Cited by the Examiner
UNITED STATES PATENTS

| | | | |
|---|---|---|---|
| 1,846,270 | 2/1932 | Olson | 33—179.5 |
| 1,886,543 | 11/1932 | Hansen | 33—179.5 |
| 2,753,634 | 7/1956 | Tamplin | 33—174 |
| 2,770,048 | 11/1956 | Ernst | 33—179.5 |
| 2,982,028 | 5/1961 | Donohoe | 33—179.5 |
| 2,998,658 | 9/1961 | Pergande | 33—179.5 |
| 3,075,291 | 1/1963 | Robertson | 33—174 |

LEONARD FORMAN, *Primary Examiner.*